United States Patent Office.

FRANCIS CRUICKSHANK, OF EDINBURGH, GREAT BRITAIN.

*Letters Patent No. 64,638, dated May 14, 1867*

IMPROVED COATING FOR IRON SHIPS AND OTHER STRUCTURES.

*The Schedule referred to in these Letters Patent and making part of the same.*

TO ALL WHOM IT MAY CONCERN:

Be it known that I, FRANCIS CRUICKSHANK, of Edinburgh, in the county of Mid-Lothian, Kingdom of Great Britain and Ireland, have invented a new, useful, and improved Anti-Fouling Coating for Iron and other Ships, and for wooden and iron piers, breakwaters, buoys, and similar structures; and I do hereby declare the following to be a full, clear, and exact description of the same.

My invention relates to the prevention of the fouling of the bottoms of iron and other ships by means of certain mercurial compounds, hereinafter specified, made up or incorporated with a suitable medium to form a coating or paint to be applied to the surface to be protected, and the said coating or paint may also be advantageously applied to piers, breakwaters, buoys, and similar structures, to prevent the fouling to which such structures are ordinarily liable in sea water. The mercurial compounds referred to are, first, red oxide of mercury; second, white precipitate of mercury, the substance specified in the British Pharmacopœia as "*Hydrargyrum ammoniatum;*" and third, oxychloride of mercury, or any of the various definite chemical compounds of corrosive sublimate and protoxide of mercury included under that designation. The medium with which the mercurial compounds are incorporated may be varied, provided that it is of a resinous or oleaginous but not of a saponaceous character. I prefer to use a medium consisting of boiled linseed oil mixed with a solution of gutta percha or rubber.

In order to enable others skilled in the art to make and use my invention, I will now proceed to describe what I at present believe to be the best way of preparing my improved anti-fouling coating.

I take a quantity of rubber and dissolve it by the aid of heat in naphtha until it is of a paste-like consistency. I then mix in a quantity of boiled linseed oil, sufficient to make the whole of a cream-like consistency, and I find that about four gallons of the oil are required for every pound of paste. These ingredients should be carefully and thoroughly mixed with the aid of heat. I then thoroughly mix together in a grinding-mill twenty to twenty-eight pounds of the mercurial compounds, sixty to sixty-seven pounds of red or white lead, burnt umber, or other convenient ordinary pigment, and fourteen pounds of the medium prepared as hereinbefore described. The office of the ordinary pigment is simply to dilute and give any required color to the anti-fouling ingredients. The mercurial ingredient may consist of equal or unequal portions of the mercurial compounds hereinbefore specified, or it may consist entirely of one or two of those compounds. Thus prepared the mixture may be applied as a coating to the ship or structure, and, if necessary, it may be rendered more fluid by the intermixture of more linseed oil. The coating may be applied directly to the ship or structure, or over one or more well-dried preliminary coatings of paint or composition, such as is commonly applied to prevent corrosion.

Although I believe the proportions of the ingredients and the manner of preparing my improved coating hereinbefore detailed to be the most suitable in practice, I do not restrict myself thereto, as they may be varied within reasonable limits without injury, whilst the mercurial compounds hereinbefore specified may be mixed with any resinous or oleaginous but not saponaceous medium, such, for example, as is or may be used for preventing the corrosion of ships' bottoms.

But what I claim as my invention, and desire to secure by Letters Patent, is—

The preparing of an improved anti-fouling coating with the mercurial compounds hereinbefore specified, and substantially in the manner hereinbefore described.

In testimony whereof, I have signed my name to this specification in the presence of two subscribing witnesses.

FRANCIS CRUICKSHANK.

Witnesses:
EDMUND HUNT,
ADOLF SJOBERG.